United States Patent [19]

Gutman

[11] 4,005,945
[45] Feb. 1, 1977

[54] DRILL GUIDE

[76] Inventor: David Gutman, 503 Reed St., Philadelphia, Pa. 19147

[22] Filed: Sept. 25, 1975

[21] Appl. No.: 616,895

[52] U.S. Cl. .................. 408/115 B; 10/129 M; 269/87.3; 269/321 N; 408/72 B; 408/97; 408/104

[51] Int. Cl.² ............... B23B 47/28; B23B 49/02; B25B 1/00

[58] Field of Search .......... 408/105, 108, 113, 115, 408/102, 104, 72, 72 B, 97; 269/87.3, 243, 321 N; 10/129 M

[56] References Cited

UNITED STATES PATENTS

| | | | |
|---|---|---|---|
| 320,536 | 6/1885 | Bryant | 408/97 X |
| 550,767 | 12/1895 | Thielscher | 408/97 |
| 1,293,143 | 2/1919 | McKenzie | 408/72 |
| 1,712,453 | 5/1929 | Bieder | 408/72 |
| 2,418,234 | 4/1947 | McCullough | 408/97 |
| 2,886,080 | 5/1959 | Rappeport | 269/87.3 |
| 3,589,825 | 6/1971 | Wojcik | 408/72 |

Primary Examiner—Othell M. Simpson
Assistant Examiner—William R. Briggs
Attorney, Agent, or Firm—Morton J. Rosenberg

[57] ABSTRACT

A clamping and drill guide apparatus which is utilized by an operator to aid in manually drilling holes in work pieces which have an arcuate contour. The apparatus includes a first clamping member which has a multiplicity of openings axially passing through the first clamping member in a vertical direction. A second clamping member located in alignment with the first clamping member and below such includes a multiplicity of threaded through openings which axially pass in the vertical direction and are alignable with each of the through openings in the first clamping member. A pair of screw and nut members provide for clamping the first member to the second member when a work piece is inserted therebetween. Further, the apparatus provides a mechanism for axially aligning the work piece between the first member and the second member.

9 Claims, 4 Drawing Figures

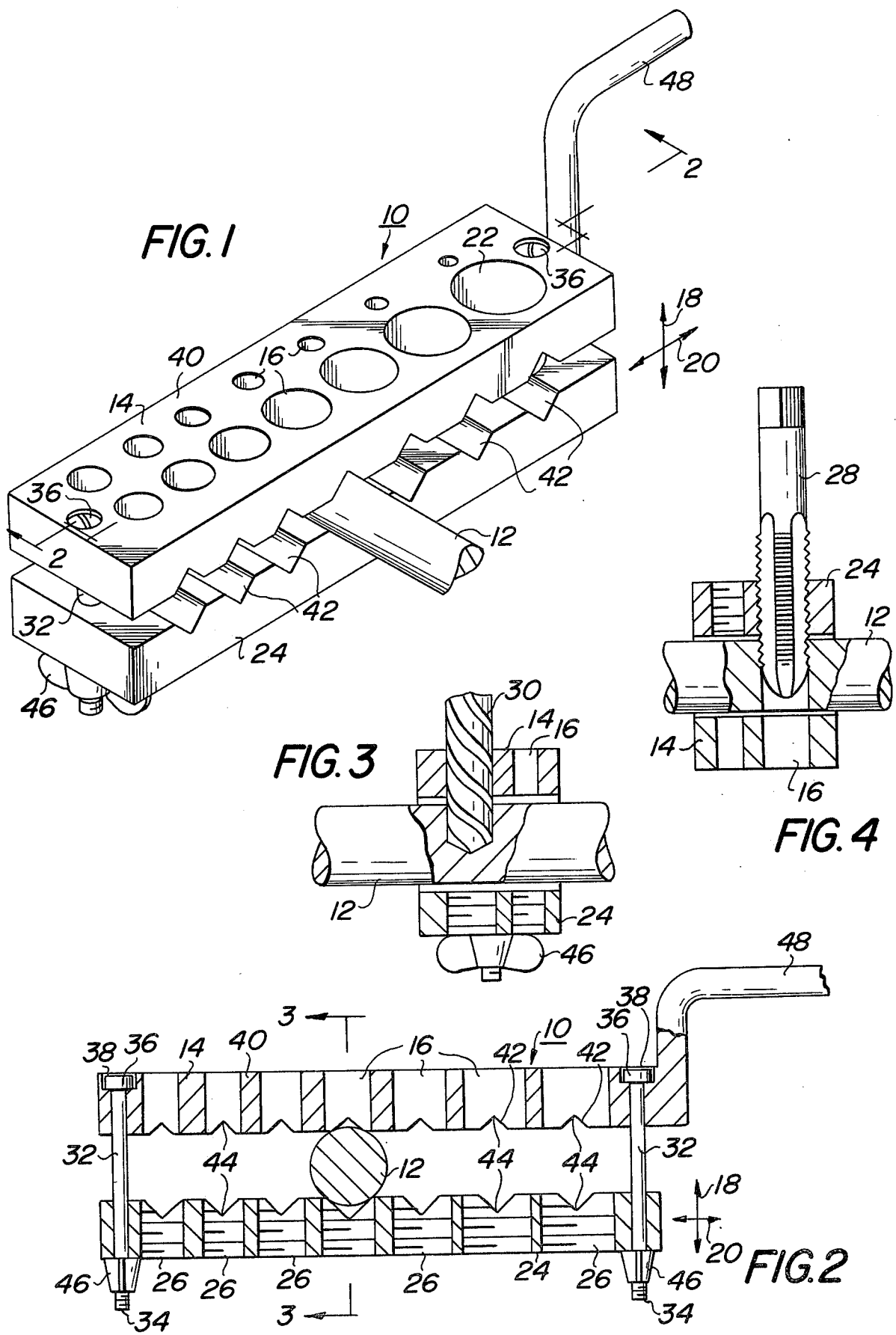

DRILL GUIDE

BACKGROUND OF THE INVENTION

1. FIELD OF THE INVENTION

This invention relates to clamping and drill jig or guide apparatus. In particular, this invention relates to a drill guide jig apparatus which may be manually held by an operator for extremely accurate drilling of arcuate contoured work pieces. Still further, this invention pertains to an apparatus where small diameter holes may be drilled with great accuracy through cylindrical work pieces.

2. PRIOR ART

Drill jigs are known in the art. However, in some prior cases such drill jigs must be incorporated with a drill press to aid in clamping work pieces. This incorporates a great expense and a complexity of hardware.

Additionally, in some prior drill jigs, one specific hole size is provided to permit drilling of various sized pieces. Thus, when the hole size to be drilled is to be changed, expense in set up costs are incurred.

Additionally, in some prior clamp and drill jig apparatus only drilling operations may be accomplished and a further tool or device must be used to provide tapping operations. In such prior devices, the work pieces must be removed from one apparatus and passed to another apparatus before the operations can be consummated. This has led to increased operating costs and increased capitalization costs in the buying of a number of clamping and drilling devices.

SUMMARY OF THE INVENTION

A parallel clamp and drill guide apparatus for drilling holes in work pieces which have an arcuate contour. The apparatus includes a first clamping member having a plurality of through openings axially passing in a vertical direction. A second clamping member has a plurality of threaded through openings which axially pass in the vertical direction. Each of the threaded through openings are axially alignable with each of the through openings in the first clamping member. Additionally, means are provided for releasably clamping the first member to the second member when the work piece is inserted therebetween. Further, means are provided for axially aligning the work piece between the first member through openings and the second member threaded through openings.

DESCRIPTION OF THE DRAWINGS

FIG. 1 is an isometric view of the parallel clamp and drill jig apparatus;

FIG. 2 is a sectional drawing of the parallel clamp and drill jig apparatus taken along the section line 2—2 of FIG. 1;

FIG. 3 is a sectional drawing taken along the section line 3—3 of FIG. 2; and

FIG. 4 is an inverted sectional drawing of the parallel clamp and drill jig apparatus taken along the section line 4—4 of FIG. 2.

DESCRIPTION OF THE PREFERRED EMBODIMENTS

Referring now to FIGS. 1–4 there is shown parallel clamp and drill jig or guide apparatus 10 for drilling appropriately sized holes in work piece 12. Apparatus 10 is generally utilized in aiding an operator to drill holes in work pieces 12 that have an arcuate contour or some other non-planar contour which in the past has been found to cause difficulty to operators in providing a manual mechanism whereby accurate holes may be drilled in such work pieces. As is shown in FIG. 1–4, apparatus 10 is highly applicable to the drilling of holes through cylindrical work pieces 12 of varying diameters. In overall concept, apparatus 10 permits the operator to manually clamp work piece 12 within apparatus 10 and to hold such work piece 12 in fixed relation while at the same time permitting use of his other hand to effect the drilling through the work piece 12 with a high degree of accuracy.

As shown in FIG. 1, parallel clamp and drill jig apparatus 10 includes first clamping member 14 which has a plurality of through openings 16 axially passing through first member 14 in a vertical direction defined by directional arrow 18. As can be seen, through openings 16 are arranged in pairs throughout the longitudinal extension of first or upper clamping member 14 where the longitudinal extension is defined by longitudinally directed arrow 20. Diameter line 22 for each pair of through openings 16 must lie in a straight line passing normal to longitudinal direction 20 for purposes as will be set forth in following paragraphs. As will be understood, although 14 through openings 16 are shown in the accompanying figures, any number of openings 16 may be utilized which correspond to generally accepted standard drill opening sizes.

First or upper clamping member 14 is generally formed of a hardened steel and is geometrically contoured in a block form with an extension in longitudinal direction 20. However, the exact contour of clamping member 14 is not critical to the inventive concept with the exception that it be substantially planar.

Second or lower clamping member 24 includes a plurality of threaded through openings 26 which axially pass in vertical direction 18 as is clearly shown in FIG. 2. Second clamping member 24 extends in longitudinal direction 20 and includes substantially the same contour as upper clamping member 14. Lower clamping member 25 includes the same number of threaded through openings 26 corresponding to the through openings 16 of clamping member 14. Additionally, each of threaded through openings 26 are axially alignable with each of through openings 16 in first clamping member 14 in vertical direction 18. Thus, when work piece 12 is clamped between first and second clamping members of 14 and 24 respectively as is shown in FIGS. 1 and 2 it is to be understood that corresponding openings 16 and 26 are axially aligned. Additionally, each of threaded through openings 26 include a diameter slightly in excess of a corresponding vertically aligned through opening 16 passing through first clamping member 14 in order to provide a guide for tapping tool 28 shown in FIG. 4 whereby work piece 12 may be threaded if such is desired by the operator.

Second clamping member 24 is generally made of hardened steel as was the case for clamping member 14 in order that there is provided a reasonably hard bearing surface when drill 30 is passed through aligned openings 16 and 26.

First and second clamping members 14 and 24 are releasably clamped to each other when work piece 12 is inserted therebetween as is shown in FIGS. 1 and 2. The releasable clamping mechanism includes a pair of screw members 32 passing through both first and second members 14 and 24 in vertical direction 18 as is clearly shown in FIG. 2. Screw members 32 are mounted and positionally located on opposing longitudinal ends of members 14 and 24. Screw members 32 pass through non-threaded openings passing in a vertical direction through both of clamping members 14 and 24. Screw members 32 may include a lower threaded section 34 or may be threaded throughout the extended vertical length of each of screw members 32. Each of screw members 32 includes a head end 36 which has a greater diameter than the main extended body of screw members 32. First clamping member 14 includes a pair of recesses 38 positionally located as is shown in FIGS. 1 and 2 in order that head ends 36 of screw members 32 may be inserted therein. These recesses 38 are formed in order that head ends 36 may be passed internal to first member 14 whereby upper surface 40 of member 14 will remain in planar contour after work piece 12 is clamped between first and second clamping members 14 and 24 in order that upper surface 40 may be placed on a flat table or other working surface without being susceptible to a rocking motion when tapping tool 28 is employed to provide a threaded opening in work piece 12.

A mechanism is provided for axially aligning work piece 12 between first member 14 and second clamping member 24 vertically with corresponding through openings 16 and 26. The axial alignment mechanism includes a plurality of V-notches 42 formed in both first and second clamping members 14 and 24 as is clearly shown in FIGS. 1 and 2. Each of the V-notches includes apex 44 which is in vertical alignment with corresponding through openings 16 and 26 in members 14 and 24. V-notches 42 pass in a direction normal to longitudinal direction 20 in order that work piece 12 may be placed between a pair of upper and lower V-notches 42 as is shown in FIGS. 1 and 2. Thus, each V-notch 42 has an apex 44 which passes in a direction concurrent with diameter line 22 corresponding to each pair of openings 16 and 26 as has hereinbefore been described.

It will be noted, that associated with each of screw members 32 there is included nut members 46 to maintain the clamping action of work piece 12 between first and second clamping members 14 and 24. Nut members 46 threadedly engage each of screw members 32 at a lower threaded end section 34 and bears against a lower surface of second clamping member 24. For ease of manipulation nut members 46 may be wing nuts or some like type of threaded securement member.

Handle member 48 is secured in fixed relation to first clamping member 14 to allow an operator to manually hold apparatus 10 when work piece 12 is being drilled or tapped. Handle member 48 passes external to first clamping member 14 in a concurrent direction to the generally longitudinal extension of member 14. As is seen in FIGS. 1 and 2 handle member 48 may be L-shaped and may be secured to one end of first member 14 through threaded securement, bonding, or may even be formed in one piece formation with clamping member 14. Thus, handle member 48 provides a means whereby an operator may easily hold apparatus 10 in one hand during the drilling and/or tapping operation.

In overall operation, cylindrical work piece 12 is inserted in between appropriate openings 16 and 26. Nut members 46 are tightened on screw members 32 until work piece 12 is clamped between first and second clamping members 14 and 24. It is to be understood that upper and lower clamping member 14 and 24 be maintained in parallel alignment when work piece 12 is being clamped therebetween. This parallel alignment will insure a relatively straight and accurate hole being drilled by drill 30. Once work piece 12 is clamped in fixed relation between upper and lower clamping members 14 and 24, drill 30 is passed through openings 16 and passes through work piece 12 into lower threaded through openings 26. If the hole which is drilled in work piece 12 is desired to be tapped, apparatus 10 is reversed on a table and tapping tool 28 is passed through lower threaded through openings 26 into work piece 12 to complete the tapping operation.

The invention as herein described has been shown to be an effective clamping and drilling jig apparatus which considerably aids an operator in drilling holes in varying contour dimension work pieces 12. While the invention has been described with certain specific embodiments thereof, it will now be understood that further modification will suggest themselves to those skilled in the art, and it is intended to cover such modification within the scope of the appended claims.

What is claimed is:

1. A parallel clamp and drill jig apparatus for drilling holes in work pieces having an arcuate contour comprising:
   a. a first clamping member having a plurality of through openings axially passing in a vertical direction;
   b. a second clamping member having a plurality of threaded through openings axially passing in said vertical direction, each of said threaded through openings being axially alignable with each of said through openings in said first clamping member;
   c. means for releasably clamping said first member to said second member when said work piece is inserted therebetween; and,
   d. means for axially aligning said work piece between said first member through openings and said second member threaded through openings.

2. The parallel clamp and drill jig apparatus as recited in claim 1 where each of said threaded through openings include a diameter in excess of a corresponding through opening diameter passing through said first clamping member for providing a guide for a tapping tool whereby said work piece may be threaded.

3. The parallel clamp and drill jig apparatus as recited in claim 1 where said means for releasably clamping said first member to said second member includes:
   a. a pair of screw members passing through said first and second members in said vertical direction, said screw members being positionally located on opposing longitudinal ends of said members; and,
   b. a pair of nut members for threadedly engaging each of said screw members at a lower end and for bearing against a lower surface of said second member.

4. The parallel clamp and drill jig apparatus as recited in claim 3 where said nut members are wing nuts adapted to be manually threaded on each of said screw members.

5. The parallel clamp and drill jig apparatus as recited in claim 3 where each of said screw members includes a head member adapted to be inserted into a corresponding recess formed in an upper surface of said first member whereby said upper surface is planar in contour when said work piece is clamped between said first and second clamping members.

6. The parallel clamp and drill jig apparatus as recited in claim 1 where said axial alignment means includes a plurality of V-notches formed in said first and second clamping members, each of said V-notches having an apex in vertical alignment with corresponding through openings in said first member and threaded through openings in said second members.

7. The parallel clamp and drill jig apparatus as recited in claim 1 including handle means secured in fixed relation to said first member for manually holding said apparatus when said work piece is being drilled.

8. The parallel clamp and drill jig apparatus as recited in claim 7 where said handle means passes external said first member in a concurrent direction to an extension of said first member, said handle means being secured to an end of said first member.

9. The parallel clamp and drill jig apparatus as recited in claim 1 where said first and second clamping members are formed of hardened steel.

* * * * *